United States Patent
Takenaka

(10) Patent No.: US 9,696,805 B2
(45) Date of Patent: Jul. 4, 2017

(54) ELECTRONIC DEVICE

(75) Inventor: Tetsuya Takenaka, Yamato (JP)

(73) Assignee: KYOCERA Corporation, Kyoto (JP)

( * ) Notice: Subject to any disclaimer, the term of this patent is extended or adjusted under 35 U.S.C. 154(b) by 221 days.

(21) Appl. No.: 14/129,869

(22) PCT Filed: Jun. 22, 2012

(86) PCT No.: PCT/JP2012/004080
§ 371 (c)(1),
(2), (4) Date: Dec. 27, 2013

(87) PCT Pub. No.: WO2013/001775
PCT Pub. Date: Jan. 3, 2013

(65) Prior Publication Data
US 2014/0139472 A1    May 22, 2014

(30) Foreign Application Priority Data

Jun. 28, 2011  (JP) ................. 2011-143009

(51) Int. Cl.
*G06F 3/041*   (2006.01)
*G06F 3/01*    (2006.01)
*G06F 3/0488*  (2013.01)

(52) U.S. Cl.
CPC .............. *G06F 3/016* (2013.01); *G06F 3/041* (2013.01); *G06F 3/0488* (2013.01)

(58) Field of Classification Search
CPC ............... G06F 3/0488; G06F 3/04883; G06F 3/04808; G06F 3/0416
USPC ................................. 345/156–184
See application file for complete search history.

(56) References Cited

U.S. PATENT DOCUMENTS

2008/0024459 A1*  1/2008  Poupyrev ............... G06F 3/016
                                                    345/173

FOREIGN PATENT DOCUMENTS

| JP | 2002-323955 A |   | 11/2002 |
|----|---------------|---|---------|
| JP | 2002323955 A  | * | 11/2002 |
| JP | 2006-039745 A |   | 2/2006  |
| JP | 2008-033739 A |   | 2/2008  |

OTHER PUBLICATIONS

International Search Report; PCT/JP2012/004080; Sep. 11, 2012.

* cited by examiner

*Primary Examiner* — Carolyn R Edwards
(74) *Attorney, Agent, or Firm* — Studebaker & Brackett PC

(57) ABSTRACT

Provided is an electronic device including a contact detection unit 16 configured to detect a contact made by a contacting object, a pressure detection unit 13 configured to detect pressure applied to the contact detection unit 16, and a control unit 11 configured to perform control so that predetermined processing is carried out when data based on the pressure detected by the pressure detection unit 13 satisfies a predetermined standard. When the contact detection unit 16 detects another contact within a predetermined time period after the predetermined processing has been carried out, the control unit 11 performs control so that the predetermined processing is carried out when the data based on the pressure satisfies a lower standard than the predetermined standard.

7 Claims, 13 Drawing Sheets

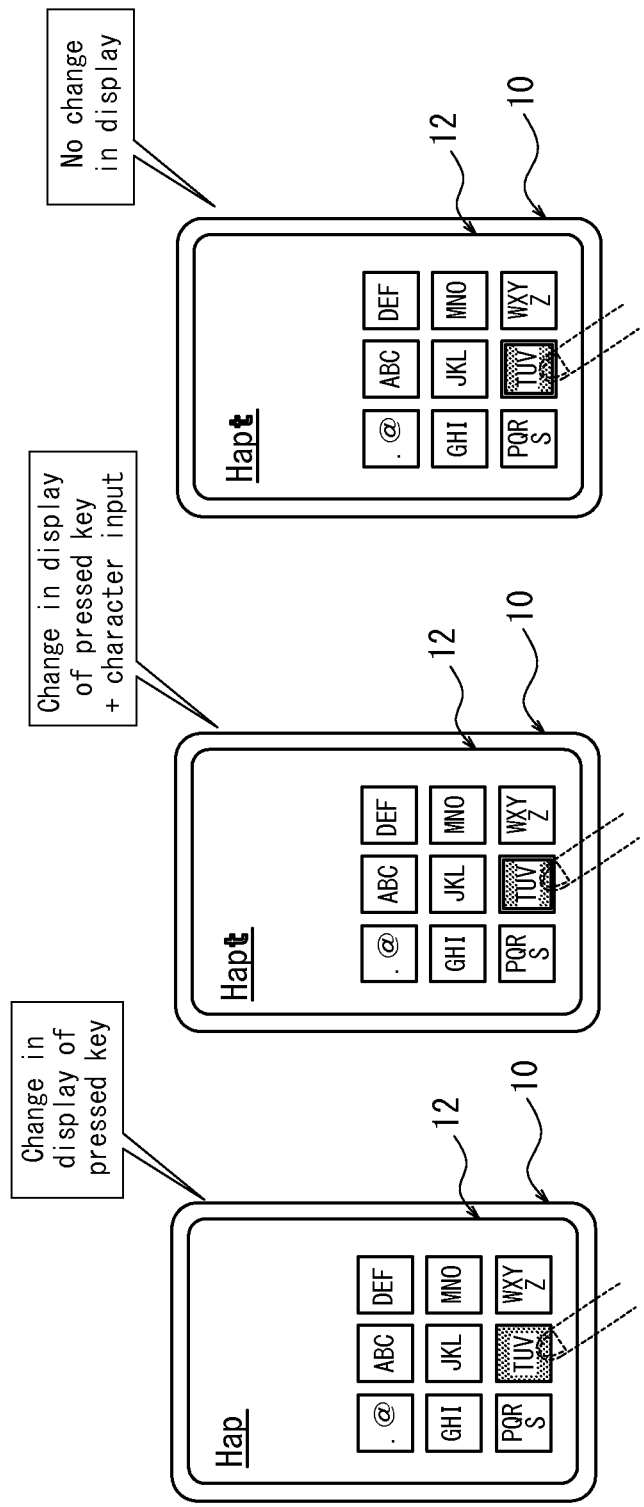

ELECTRONIC DEVICE

CROSS-REFERENCE TO RELATED APPLICATION

This application claims priority to and the benefit of Japanese Patent Application No. 2011-143009 filed on Jun. 28, 2011, the entire contents of which are incorporated herein by reference.

FIELD

The present invention relates to an electronic device. In detail, the present invention relates to an electronic device that is configured to perform predetermined processing, such as displaying a character, upon detection of an operation by an operator made to a contact detection unit such as a touch sensor.

BACKGROUND

In recent years, mobile terminals such as cellular phones and smart phones, calculators, information devices such as ticket vending machines, industrial devices (factory automation equipment), and the like are increasingly provided with an input device including a touch panel configured by a display unit and a touch sensor disposed on the display unit, as an input device such as an operation unit for detecting an input operation by the operator, a switch and the like.

In such an input device, a layout of an operation screen displayed on the touch panel may be varied at will. Therefore, according to an input operation by the operator, the input device is capable of improving convenience for the operator, by, for example, displaying only necessary keys as occasion requires.

There are known a variety of types of the touch sensors, such as a resistive film type, a capacitive type, an optical type, and the like. However, any types of the touch sensors are configured to detect a contact made to the touch sensor by a finger or a stylus pen. Accordingly, in the input device that performs predetermined processing, such as displaying a character, in response to detection of the contact made to the touch sensor, the processing such as displaying a character is initiated even when the operator lightly touches the touch sensor.

However, in the above input device, a situation arises in which, even when the operator touches the touch sensor lightly by mistake without any intension to display the character, for example, the processing of displaying the character is initiated upon detection of the contact made to the touch sensor. When the processing is initiated by the unintentional operation by the operator as in the above situation, undesired processing for the operator is carried out.

In view of the above, there has been proposed the input device that is provided with a pressure detection unit configured to detect pressure applied to the touch panel and that carries out predetermined processing upon detection of pressure satisfying a predetermined standard by identifying the detection as the operation having been made according to the intention of the operator. (For example, refer to Patent Literature 1.)

CITATION LIST

Patent Literature 1: Japanese Patent Application Publication No. 2006-39745

SUMMARY

The input device of a touch panel type described in Patent Literature 1 is provided with the pressure detection unit, and therefore, the input device is capable of initiating the predetermined processing upon detection of the pressure satisfying the predetermined standard by identifying the detection as an operator's operation having been made. The input device of a touch panel type prevents the situation where the predetermined processing is initiated based on an operation made, for example, when the operator unintentionally touches the touch panel lightly.

However, by making the predetermined processing carried out only when the pressure satisfying the predetermined standard is detected as in the above case, the operator needs to apply the pressure satisfying the predetermined standard every time the operator makes an operation. It may be burdensome for the operator to apply the pressure satisfying the predetermined standard in each operation in order to have the predetermined processing carried out.

For example in a multi-tap type operation input where characters are input using a ten-key pad such as a mobile phone, the operator often needs to press the same key many times. In such a case, when the operator needs to apply the pressure satisfying the predetermined standard in each operation, the operation is expected to be a cumbersome task for the operator.

In view of the above problems, the present invention is to provide an electronic device that is capable of preventing the predetermined processing from being carried out in accordance with an unintentional operation by the operator and reducing a burden to the operator for the operation.

An electronic device according to an aspect of the present invention includes: a contact detection unit configured to detect a contact made by a contacting object; a pressure detection unit configured to detect pressure applied to the contact detection unit; and a control unit configured to perform control so that predetermined processing is carried out when data based on the pressure detected by the pressure detection unit satisfies a predetermined standard, such that when the contact detection unit detects another contact within a predetermined time period after the predetermined processing being carried out, the control unit performs control so that the predetermined processing is carried out when the data based on the pressure satisfies a lower standard than the predetermined standard.

An electronic device according to another aspect of the present invention for achieving the above objective includes: a contact detection unit configured to detect a contact made by a contacting object; a pressure detection unit configured to detect pressure applied to the contact detection unit; and a control unit configured to perform control so that predetermined processing is carried out when data based on the pressure detected by the pressure detection unit satisfies a predetermined standard, such that when the contact detection unit detects another contact within a predetermined time period after the predetermined processing being carried out, the control unit performs control so that the predetermined processing is carried out.

Yet another aspect of the present invention resides in the electronic device, further including a tactile sensation providing unit configured to vibrate a contact surface of the contact detection unit, such that the control unit controls the tactile sensation providing unit to provide a tactile sensation to the contacting object that is in contact with the contact surface when the data based on the pressure detected by the pressure detection unit satisfies a tactile sensation providing standard that is set higher than the predetermined standard, and when the contact detection unit detects the other contact without the data based on the pressure satisfying the tactile sensation providing standard within the predetermined time period after the predetermined processing being carried out, the control unit performs control so that the predetermined processing is carried out when the data based on the pressure satisfies the lower standard than the predetermined standard.

Yet another aspect of the present invention resides in the electronic device, such that when the contact detection unit detects the other contact in a position different from a position of the previous contact, the control unit performs control so that the predetermined processing is carried out when the data based on the pressure satisfies the lower standard than the predetermined standard within a time period obtained by adding a predetermined additional time period to the predetermined time period.

An electronic device according to yet another aspect of the present invention includes: a contact detection unit configured to detect a contact made by a contacting object; a pressure detection unit configured to detect pressure applied to the contact detection unit; and a control unit configured to perform control so that predetermined processing is carried out when data based on the pressure detected by the pressure detection unit satisfies a first standard, such that when the data based on the pressure detected by the pressure detection unit starts to increase after decreasing to a second standard within a predetermined time period after the predetermined processing being carried out, the control unit performs control so that the predetermined processing is carried out when the data based on the pressure satisfies a lower standard than the first standard.

Yet another aspect of the present invention resides in the electronic device, further including: a tactile sensation providing unit configured to vibrate a contact surface of the contact detection unit, such that when the data based on the pressure detected by the pressure detection unit satisfies a tactile sensation providing standard that is set higher than the first standard, the control unit controls the tactile sensation providing unit to provide a tactile sensation to the contacting object that is in contact with the contact surface, and when the data based on the pressure starts to increase after decreasing to the second standard without the data based on the pressure satisfying the tactile sensation providing standard within the predetermined time period after the predetermined processing being carried out, the control unit performs control so that the predetermined processing is carried out when the data based on the pressure satisfies the lower standard than the first standard.

Yet another aspect of the present invention resides in the electronic device, such that when a position of a contact detected by the contact detection unit when the predetermined processing is carried out differs from a position of a contact detected by the contact detection unit when the data based on the pressure starts to increase after decreasing to the second standard, the control unit performs control so that the predetermined processing is carried out when the data based on the pressure satisfies the lower standard than the first standard within a time period obtained by adding a predetermined additional time period to the predetermined time period.

According to the present invention, there is provided an electronic device that is capable of preventing the predetermined processing from being carried out in accordance with an unintentional operation by an operator and reducing a burden to the operator for the operation.

BRIEF DESCRIPTION OF DRAWINGS

The present invention will be further described below with reference to the accompanying drawings, wherein:

FIGS. 11A-11C illustrate concrete examples of the processing performed by the electronic device according to the fourth embodiment;

DESCRIPTION OF EMBODIMENTS

Embodiments of the present invention will be described with reference to the drawings.

First Embodiment

Figure 1:
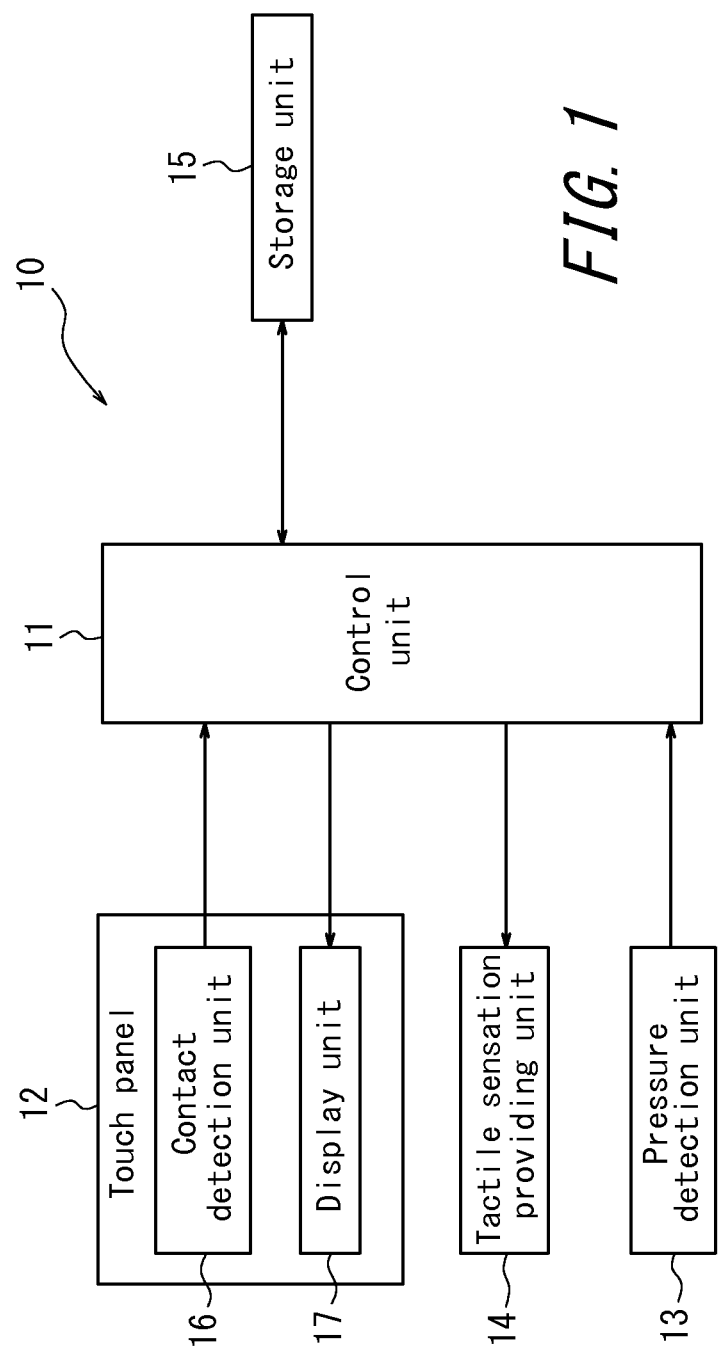
FIG. 1 is a block diagram illustrating a schematic configuration of an electronic device according to the first embodiment of the present invention.

FIG. 1 is a functional block diagram schematically illustrating a part of a configuration of an electronic device according to the first embodiment of the present invention. As illustrated in FIG. 1, an electronic device 10 includes a control unit 11, a touch panel 12, a pressure detection unit 13, a tactile sensation providing unit 14, and a storage unit 15.

The control unit 11 controls and manages the entire electronic device 10 including functional blocks of the electronic device 10. The control unit 11 is described herein to have a timer function capable of counting down a predetermined time period using an internal clock or the like. However, the control unit 11 may be configured to be embedded with another element as a timer. Alternatively, the control unit 11 may be supplied with a count signal from a timer provided outside the control unit 11.

The touch panel 12 includes a contact detection unit 16 and a display unit 17. The touch panel 12 is configured by arranging the contact detection unit 16 on a front surface side of the display unit 17 in a superposed manner.

The contact detection unit 16 detects a contact made by a finger of an operator, a stylus pen, or the like (which are collectively referred to below as a "contacting object"). The contact detection unit 16 may be of a resistive film type, a capacitive type, or an optical type, for example. Note that in order for the contact detection unit 16 to detect the contact, it is not essential for the contacting object to physically contact the contact detection unit 16. For example, when the contact detection unit 16 is of an optical type, it is not necessary for the contacting object to contact the contact detection unit 16 since the contact detection unit 16 detects a position on the contact detection unit 16 where an infrared ray is blocked by the finger or the like.

The display unit 17 is configured by using a liquid crystal display (LCD), an organic EL display, or the like. The display unit 17 performs display in accordance with applications and depicts a user interface in a predetermined display area for display, the user interface being constituted by various keys, buttons, and the like for detecting an operator's operation made to the contact detection unit 16. Such images of the various keys and buttons displayed on the display unit 17 for enabling the operator to visually confirm the operation, so that the operation made to the contact detection unit 16 of the touch panel 12 by the operator may be detected, are simply referred to below as "objects".

The pressure detection unit 13 is configured to detect pressure applied when the user carries out an operation to the contact detection unit 16 and may be configured using strain gauge sensors, elements such as piezoelectric elements, and the like whose physical or electric properties (strain, resistance, voltage, and the like) vary according to the pressure, for example. For example, when the pressure detection unit 13 is configured by using the piezoelectric elements and the like, the electric property, namely, the voltage (i.e. voltage value, which is referred to below as data based on the pressure) of the piezoelectric elements of the pressure detection unit 13 varies according to an amount of load (force) of the pressure applied to the contact detection unit 16 (or a speed, i.e. acceleration, at which the amount of load [force] changes). Then, the control unit 11 performs control so that predetermined processing is carried out based on, for example, an application when the data based on the pressure is greater than or equal to a predetermined threshold.

The control unit 11 acquires the data based on the pressure either by the pressure detection unit 13 notifying the control unit 11 of the data based on the pressure or by the control unit 11 detecting the data based on the pressure detected by the pressure detection unit 13. That is to say, the control unit 11 acquires, from the pressure detection unit 13, the data based on the pressure applied to the contact detection unit 16. Note that the data based on the pressure may be an amount of load, a power value, a resistance value, or the like, instead of the voltage value.

The pressure detection unit 13 may also be configured to measure changes in the gap between the contact detection unit 16 and the display unit 17 that is created when the contact detection unit 16 is pressed by the user. In this case, the data based on the pressure corresponds to a value of change in the gap. The pressure detection unit 13 may also be configured to measure changes in the gap between the contact detection unit 16 and another member, such as a circuit substrate.

The pressure detection unit 13 may be configured in accordance with a type of the contact detection employed in the contact detection unit 16. For example, when the contact detection unit 16 is of a resistive film type, by associating levels of resistance according to sizes of a contact area with the loads (forces) of the pressure applied to the contact surface of the touch panel, the pressure detection unit 13 may be configured without using the strain gauge sensors, piezoelectric elements, and the like. Similarly, when the contact detection unit 16 is of a capacitive type, by associating levels of capacitance with the loads (forces) of the pressure applied to the touch panel, the pressure detection unit 13 may be constituted without using the strain gauge sensors, piezoelectric elements, and the like.

The tactile sensation providing unit 14 is configured to vibrate the contact surface of the contact detection unit 16. The tactile sensation providing unit 14 is, for example, configured by using piezoelectric elements. The tactile sensation providing unit 14 allows it to transmit vibration to the contacting object that is in contact with the touch panel 12. The tactile sensation providing unit 14 may also be configured to vibrate the contact surface of the contact detection unit 16 indirectly by transmitting vibration to the electronic device 10 by a vibration motor (eccentric motor).

By vibrating the tactile sensation providing unit in accordance with the pressure (i.e. pressure applied to the touch panel) detected by the pressure detection unit 13, the tactile sensation providing unit 14 is able to generate a vibration for providing the tactile sensation to the finger of the user or the like, thus allowing the user pressing the touch panel 12 to sense that the operation has been made. The pressure detection unit 13 may also be configured integrally with the tactile sensation providing unit 14. Preferably, when both the pressure detection unit 13 and the tactile sensation providing unit 14 are constituted by using piezoelectric elements, the piezoelectric elements may be used on a shared basis such that an integrated pressure detection and tactile sensation providing unit is constituted. The reason is that the piezoelectric elements generate voltage in response to pressure applied thereto and are deformed in response to voltage applied thereto.

The tactile sensation providing unit 14 may also be configured to generate a vibration by driving the piezoelectric elements when the voltage (i.e. voltage value, namely, data) of the piezoelectric elements, which double as the pressure detection unit 13, satisfies the predetermined standard. In this regard, the state where the voltage (i.e. voltage value, namely, data) of the piezoelectric elements satisfies the predetermined standard may be when the voltage value (data) reaches the predetermined standard, when the voltage value (data) exceeds the predetermined standard, or when the voltage value (data) that is equal to the predetermined standard is detected.

The storage unit 15 stores various applications and various information that has been input and also functions as a work memory and the like. Preferably, in the present embodiment, the storage unit 15 temporarily stores, for example, a position of the contact detected by the contact detection unit 16 and the pressure detected by the pressure detection unit 13 that are to be used by the control unit 20 for processing.

In the present embodiment, the control unit 11 determines whether to carry out the predetermined processing by identifying the detection as an operation having been made to the touch panel 12 by the operator, based on the pressure that is detected by the pressure detection unit 13 while the contact detection unit 16 detects the contact. That is to say, in the present embodiment, the control unit 11 performs control so that the predetermined processing is carried out when the data based on the pressure detected by the pressure detection unit 13 satisfies the predetermined standard. Accordingly, the control unit 11 sets the predetermined standard, which serves as the standard to determine whether or not the predetermined processing is to be carried out, based on the pressure detected by the pressure detection unit 13. When determining to carry out the predetermined processing as described above, the control unit 11 controls various functional parts to start the predetermined processing such as displaying a character. Such control is described later below.

When the predetermined processing is carried out, the control unit 11 may also control the display unit 17 to change display of the object and control the tactile sensation providing unit 14 to provide the tactile sensation to the contacting object. However, in the present embodiment, setting the standard to determine whether or not to carry out the predetermined processing in accordance with an operator's operation is an essential component, and changing the display performed by the display unit 17 and providing the tactile sensation performed by the tactile sensation providing unit 14 are not essential.

Figure 2:
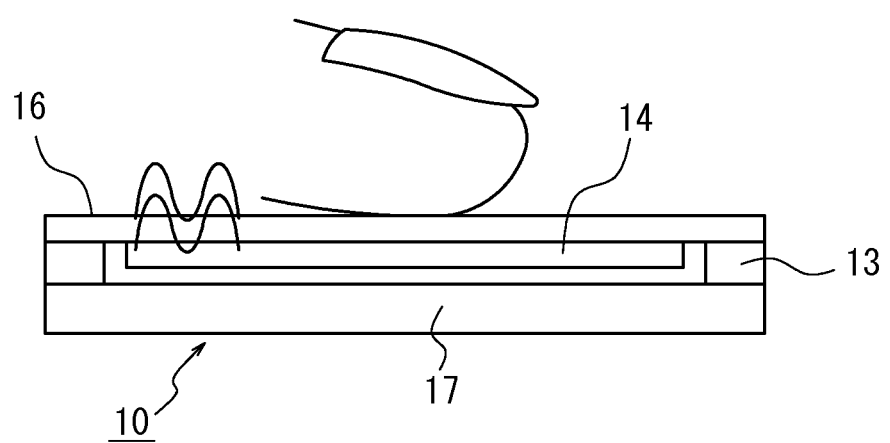
FIG. 2 illustrates one example of a housing structure of functional parts constituting the electronic device illustrated in FIG. 1.

FIG. 2 illustrates one example of a structure of the pressure detection unit 13, the tactile sensation providing unit 14, the contact detection unit 16, and the display unit 17 included in the electronic device 10 illustrated in FIG. 1. Note that FIG. 2 is a section view of a part of the electronic device 10. The figure illustrates a state where the operator intending to contact the object displayed in the display unit 17 places the finger in contact with the contact detection unit 16 at a position thereof corresponding to a position of the display unit 17 where the object is displayed. A part of the surface of the contact detection unit 16 where the contacting object is in contact with the contact detection unit 16 represents the contact surface. Based on the contact made by the contacting object as detected by the contact detection unit 16, the control unit 11 determines the position of the contact.

As illustrated in FIG. 2, the pressure detection unit 13 detects the pressure applied when the operator contacts the contact detection unit 16. Accordingly, it is preferable for the pressure detection unit 13 to be arranged to support the contact detection unit 16 so that the pressure applied to the contact detection unit 16 is transmitted to the pressure detection unit 13. By vibrating the contact surface at appropriate timing, the tactile sensation providing unit 14 provides the tactile sensation to the contacting object that is in contact with the contact surface. Accordingly, the tactile sensation providing unit 14 is arranged in contact, for example, with the contact detection unit 16 so that the vibration is transmitted to the contacting object pressing the contact detection unit 16. Note that the housing structure illustrated in FIG. 2 is merely an example as described above, and another structure is possible as long as the structure allows the contact detection unit 16 to detect the contact made by the contacting object and allows the pressure detection unit 13 to detect the pressure applied to the contact detection unit 16.

Next, a description is given of processing performed by the electronic device according to the first embodiment.

Figure 3:
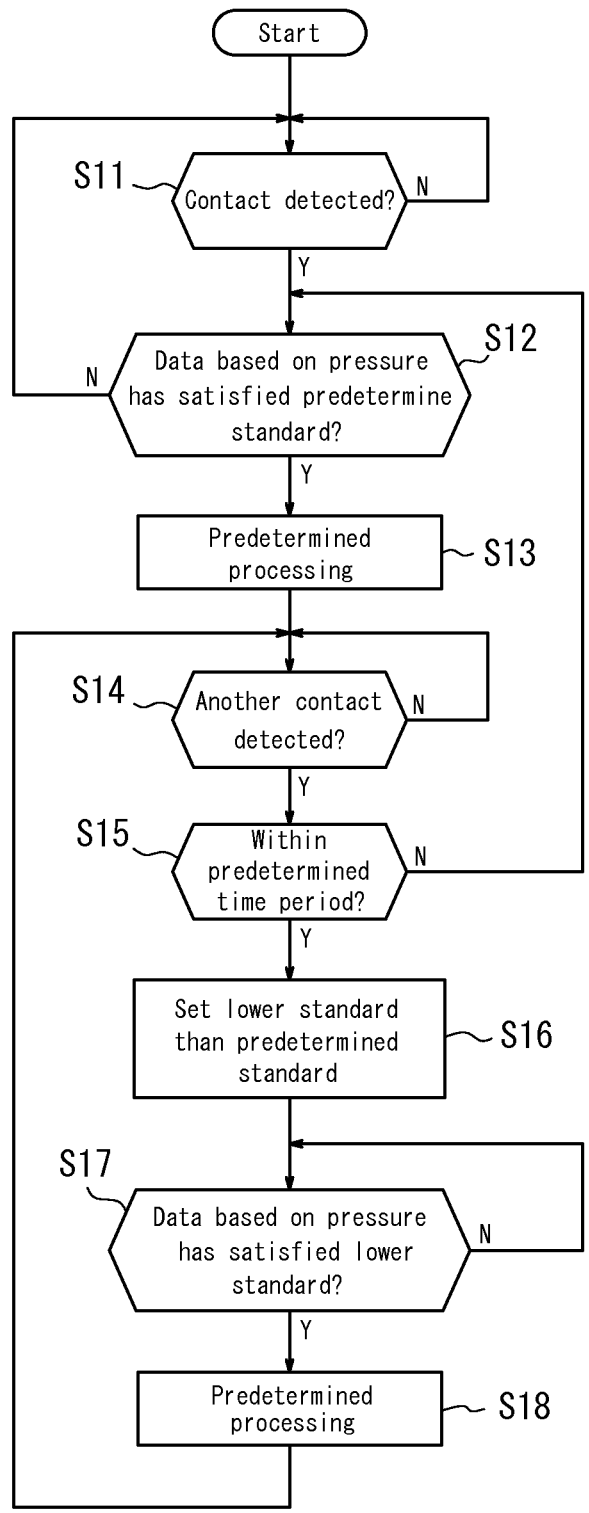
FIG. 3 is a flowchart illustrating processing performed by the electronic device according to the first embodiment.

FIG. 3 is a flowchart illustrating an example of the processing performed by the electronic device according to the first embodiment. In the present embodiment, with respect to the contact according to the first operation, the electronic device 10 carries out the predetermined processing based on the contact when the data based on the pressure according to the operation of the operator satisfies the predetermined standard. However, with respect to a contact according to an operation subsequent to the first operation, when the contact is detected within a predetermined time period, the electronic device 10 carries out the predetermined processing based on the contact when a lower standard than the predetermined standard is satisfied. The following describes such processing in detail. Note that the description assumes, as an example of the predetermined processing carried out in the present invention, a situation where the operator causes the display unit to display a character by performing an operation using the electronic device 10 for example by the multi-tap type operation as described above.

After the processing illustrated in FIG. 3 is initiated, the control unit 11 determines whether the contact detection unit 16 has detected a contact made by the contacting object (step S11). When it is determined that the contact by the contacting object has been detected in step S11, the control unit 11 determines whether data based on the pressure detected by the pressure detection unit 13 has satisfied the predetermined standard (step S12). The "predetermined standard" herein refers to the standard that the data based on the pressure is to satisfy when the predetermined processing is carried out in accordance with an operator's operation. In the present embodiment, the predetermined standard is set in advance before the operation illustrated in FIG. 3 is initiated. Furthermore, so as to prevent the predetermined processing from being carried out when the operator unintentionally touches the contact detection unit 16 lightly, the predetermined standard is set not to be excessively low.

Figure 4:
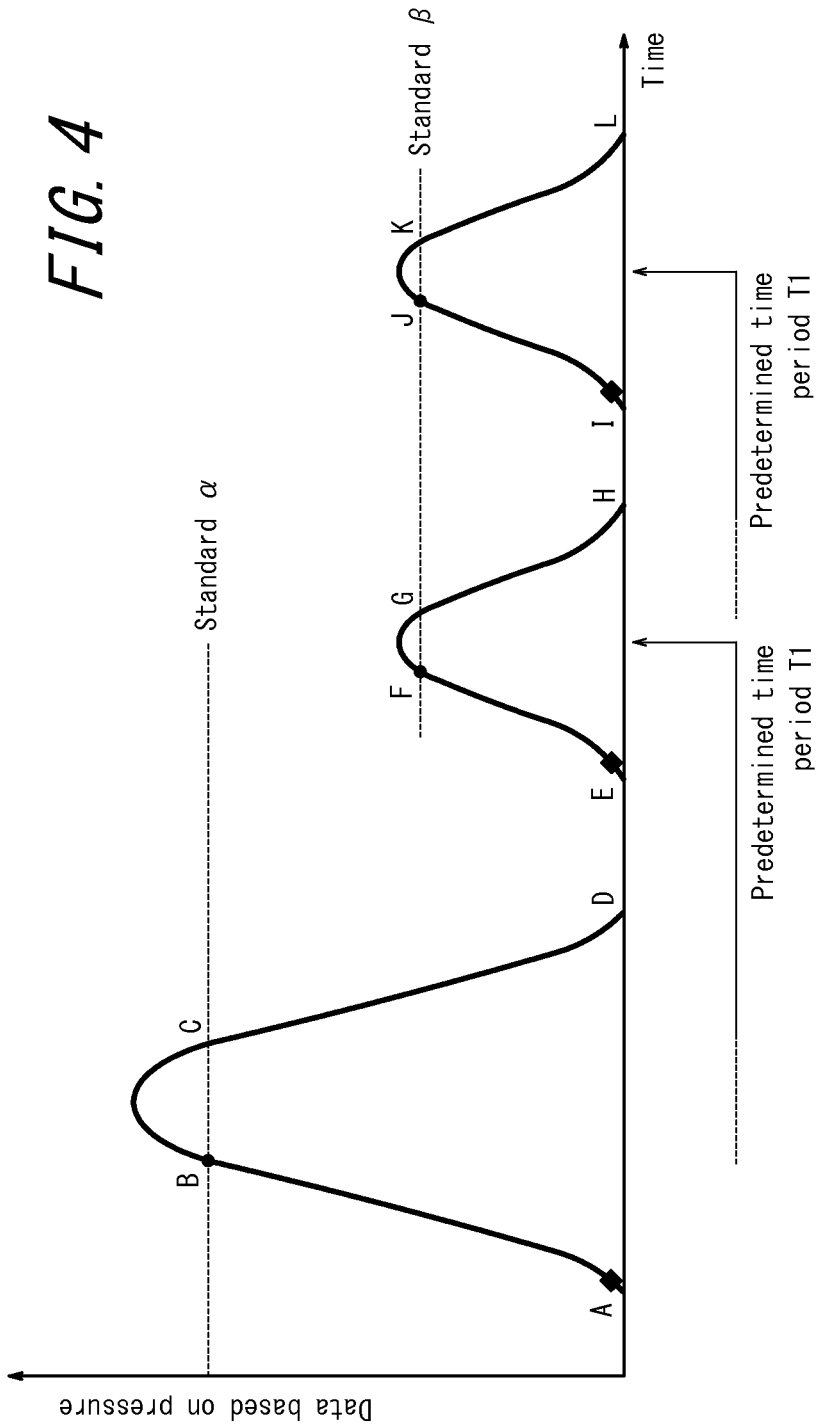
FIG. 4 illustrates processing in accordance with pressure detected by a pressure detection unit of the electronic device according to the first embodiment.

FIG. 4 illustrates processing in accordance with changes in the data based on the pressure detected by the electronic device according to the present embodiment. In FIG. 4, the horizontal axis represents a lapse of time, and the vertical axis represents the data based on the pressure detected by the pressure detection unit 13. That is to say, the curved line illustrated in FIG. 4 represents changes over time in the data based on the pressure detected by the pressure detection unit 13.

When it is determined that the data based on the pressure has not satisfied the predetermined standard to carry out the predetermined processing in step S12, the control unit 11 returns to step S11 and continues processing so as not to carry out the predetermined processing in accordance with the operator's operation. On the other hand, when it is determined that the data based on the pressure has satisfied the predetermined standard in step S12, the control unit 11 performs control for carrying out the predetermined processing in accordance with the operator's operation (step S13).

When the predetermined processing is carried out in step S13, the control unit 11 initiates the predetermined processing associated with the object corresponding to the position at which the contact was detected. The "predetermined processing associated with the object" herein refers, for example, in case of the processing in accordance with the operation made to a key object for character display, to processing of displaying the character in a predetermined position on the display unit 17. As another example, in case of the processing in accordance with the operation according to the multi-tap type operation, the "predetermined processing" may refer to displaying on the display unit 17 a plurality of characters assigned to key objects such that one character transitions to a subsequent character.

In FIG. 4, it is illustrated that the contact detection unit 16 detects the contact made by the contacting object at a time point A and that the data based on the pressure detected by the pressure detection unit 13 satisfies the predetermined standard at a time point B. That is to say, in FIG. 4, the standard α corresponds to the predetermined standard.

When the predetermined processing is carried out in step S13, the control unit 11 determines whether the contact detection unit 16 has detected another contact made by the contacting object (step S14). The "other contact" refers to a contact made by the operator again after the operator once moved the contacting object out of contact with the contact detection unit 16. In FIG. 4, the contact is once disrupted in a time point D, and the other contact is detected in a time point E.

When it is determined that the other contact has been detected in step S14, the control unit 11 determines whether the other contact was detected within the predetermined time period (step S15). The "predetermined time period" herein is set in advance to be a preferable time period (e.g. 0.5 second) for determining that the other contact is a subsequent contact made consecutively to the operation according to the first contact. Regarding the starting time point for counting down the predetermined time period, various modes may be considered. For example, as the starting time point for counting down the predetermined time period, various time points are possible, such as the time point A at which the first contact is detected, the time point B at which the data based on the pressure satisfies the predetermined standard, the time point C at which the data based on the pressure does not satisfy the predetermined standard anymore, or the time point D at which the contact is disrupted, as illustrated in FIG. 4. Thus, although the starting time point for the predetermined time period is not clearly indicated in FIG. 4, it is assumed that the predetermined time period is T1, and the ending time point of the predetermined time period T1 is indicated.

When it is determined that the other contact was not detected within the predetermined time period in step S15, the other contact is not identified as the contact made consecutively to the previous contact, and the control unit 11 returns to step S12. In this case, similarly to the previous contact, the predetermined processing may not be carried out with respect to the other contact before the data based on the pressure detected by the pressure detection unit 13 contact satisfies the predetermined standard (step S12).

On the other hand, when it is determined that the other contact was detected within the predetermined time period in step S15, the control unit 11 identifies the detected other contact as the contact made consecutively to the previous contact. In this case, the control unit 11 performs control so that the predetermined processing is carried out according to the lower standard than the predetermined standard (step S16). In FIG. 4, it is illustrated that the time point E at which the other contact is detected is within the predetermined time period T1, and therefore, the lower standard is set. That is to say, in FIG. 4, the standard β corresponds to the lower standard that is set.

When the predetermined processing has been set to be carried out according to the lower standard in step S16, the control unit 11 determines whether the data based on the pressure detected by the pressure detection unit 13 has satisfied the lower standard that has been set (step S12).

When it is determined that the data based on the pressure has satisfied the lower standard in step S17, the control unit 11 performs control for carrying out the predetermined processing in accordance with the other contact made by the operator (step S18).

When the predetermined processing is carried out in step S18, the control unit 11 initiates the predetermined processing associated with an object corresponding to a position at which the contact was detected. The "predetermined processing" herein may be substantially the same as the predetermined processing described in step S13. In FIG. 4, since the standard β is satisfied within the predetermined time period T1, the predetermined processing is carried out at a time point F.

When the predetermined processing is carried out in step S18, the control unit 11 returns to step S14 and performs control for waiting for yet another contact. That is to say, when yet another contact is detected within the predetermined time period, the predetermined processing is carried out when the data based on the pressure detected by the pressure detection unit 13 satisfies the lower standard. Additionally, as the starting time point for counting down the predetermined time period, various time points such as the time points E, F, G, and H illustrated in FIG. 4 are also possible based on a similar concept to the aforementioned predetermined time period. In FIG. 4, the yet other contact is detected at a time point I, which is within another predetermined time period T1, and therefore, the predetermined processing is carried out when the data based on the pressure satisfies the standard β, i.e., at a time point J.

In this way, in the present embodiment, the control unit 11 performs control so that the predetermined processing is carried out when the data based on the pressure detected by the pressure detection unit 13 satisfies the predetermined standard. Furthermore, in the present embodiment, when the contact detection unit 16 detects another contact within the predetermined time period after the predetermined processing was carried out, the control unit 11 performs control so that the predetermined processing is carried out when the data based on the pressing force satisfies the lower standard than the predetermined standard.

Thus, with the electronic device 10 according to the present embodiment, the operator is able to perform a subsequent operation by applying a less amount of (smaller) pressure than in the operation for which the operator made a contact for the first time. As a result, with the electronic device 10 according to the present embodiment, the predetermined processing is prevented from being carried out in accordance with an unintentional operation by the operator, and the burden to the operator for the operation is reduced.

Second Embodiment

Next, the second embodiment of the present invention will be described.

The second embodiment modifies the processing performed by the control unit 11 included in the electronic device 10 according to the first embodiment described above. Preferably, when another contact is detected within a predetermined time period after the predetermined processing was carried out in accordance with the first contact, as with the electronic device 10 according to the first embodiment, an electronic device according to the second embodiment carries out the predetermined processing in response to the detection of the other contact. Except for the above point, the electronic device according to the second embodiment may be embodied by using basically the aforementioned configuration and control of the electronic device 10 described in the first embodiment. Therefore, a description of the same or similar parts as in the first embodiment is omitted as appropriate.

Figure 5:
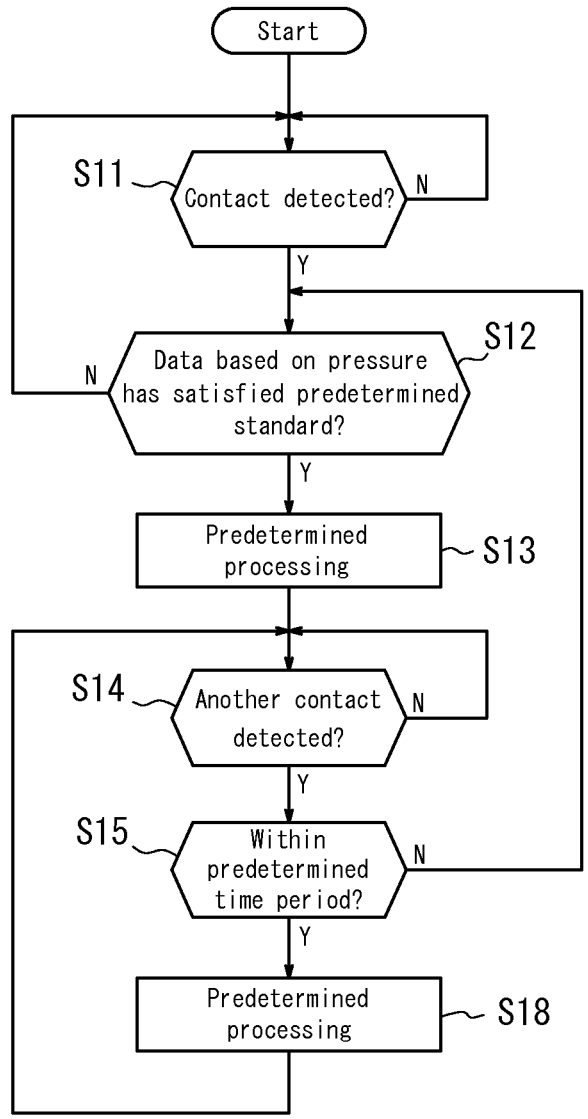
FIG. 5 is a flowchart illustrating processing performed by an electronic device according to the second embodiment.

FIG. 5 is a flowchart illustrating an example of processing performed by the electronic device according to the second embodiment. FIG. 5 differs from the flowchart described with reference to FIG. 3 in that the processing pertaining to steps S16 and S17 illustrated in FIG. 3 is not performed. The remaining processing is performed similarly to the processing performed by the electronic device according to the first embodiment.

Figure 6:
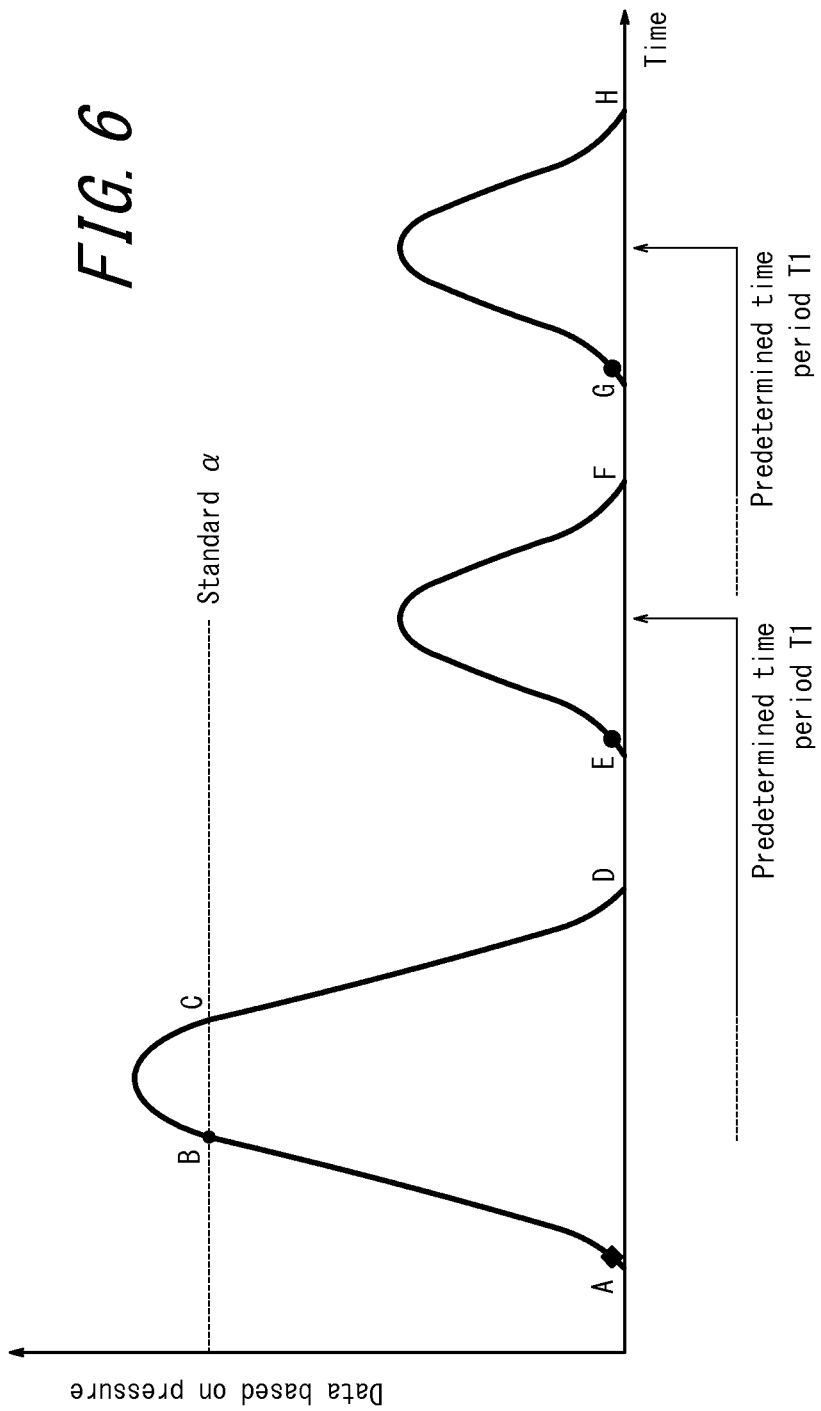
FIG. 6 illustrates processing in accordance with changes in data based on pressure detected by a pressure detection unit of the electronic device according to the second embodiment.

FIG. 6 illustrates processing in accordance with changes in data based on pressure detected by the electronic device according to the present embodiment. In FIG. 6, various reference signs have similar meanings to those described in FIG. 4. That is to say, the curved line illustrated in FIG. 6 also represents the changes over time in the data based on the pressure detected by the pressure detection unit 13.

The present embodiment is, similarly to the first embodiment, such that, when the first contact is detected in step S11 and when the data based on the pressure satisfies the predetermined standard ($\alpha$) in step S12, the predetermined processing is carried out in step S13. In FIG. 6, the first contact is detected at the time point A, and the predetermined standard ($\alpha$) is satisfied in the time point B, and as a result, the predetermined processing is carried out.

After the predetermined processing was carried out in step S13, when another contact is detected in step S14 and when it is determined that the detection occurred within the predetermined time period in step S15, the control unit 11 performs control for carrying out the predetermined processing (step S18). In FIG. 6, since the time point E at which the other contact is detected is within the predetermined time period T1, the predetermined processing is carried out at the time point E. Similarly, in FIG. 6, since the time point G at which yet another contact is detected is also within the predetermined time period T1, the predetermined processing is carried out at the time point G.

As described above, in the second embodiment, similarly to the first embodiment, the control unit 11 performs control so that the predetermined processing is carried out when the data based on the pressure detected by the pressure detection unit 13 satisfies the predetermined standard. However, in the second embodiment, the control unit 11 performs control so that the predetermined processing is carried out when the contact detection unit 16 detects another contact within the predetermined time period after the predetermined processing was carried out.

Consequently, with the electronic device 10 according to the second embodiment also, the operator is able to perform a subsequent operation by applying a less amount of (smaller) pressure than in the operation for which the operator made a contact for the first time. As a result, with the electronic device 10 according to the present embodiment, the predetermined processing is prevented from being carried out in accordance with an unintentional operation by the operator, and the burden to the operator for the operation is reduced.

Third Embodiment

Next, the third embodiment of the present invention will be described.

The third embodiment also modifies the processing performed by the control unit 11 included in the electronic device 10 according to the first embodiment described above. Preferably, when determining that the data based on the pressure once decreased to a predetermined standard and then started to increase within the predetermined time period after the predetermined processing was carried out in accordance with the first contact, as with the electronic device 10 according to the first embodiment, an electronic device according to the third embodiment carries out the predetermined processing. Except for the above point, the electronic device according to the third embodiment may be embodied by using basically the aforementioned configuration and control of the electronic device 10 described in the first embodiment. Therefore, a description of the same or similar parts as in the first embodiment is omitted as appropriate.

Figure 7:
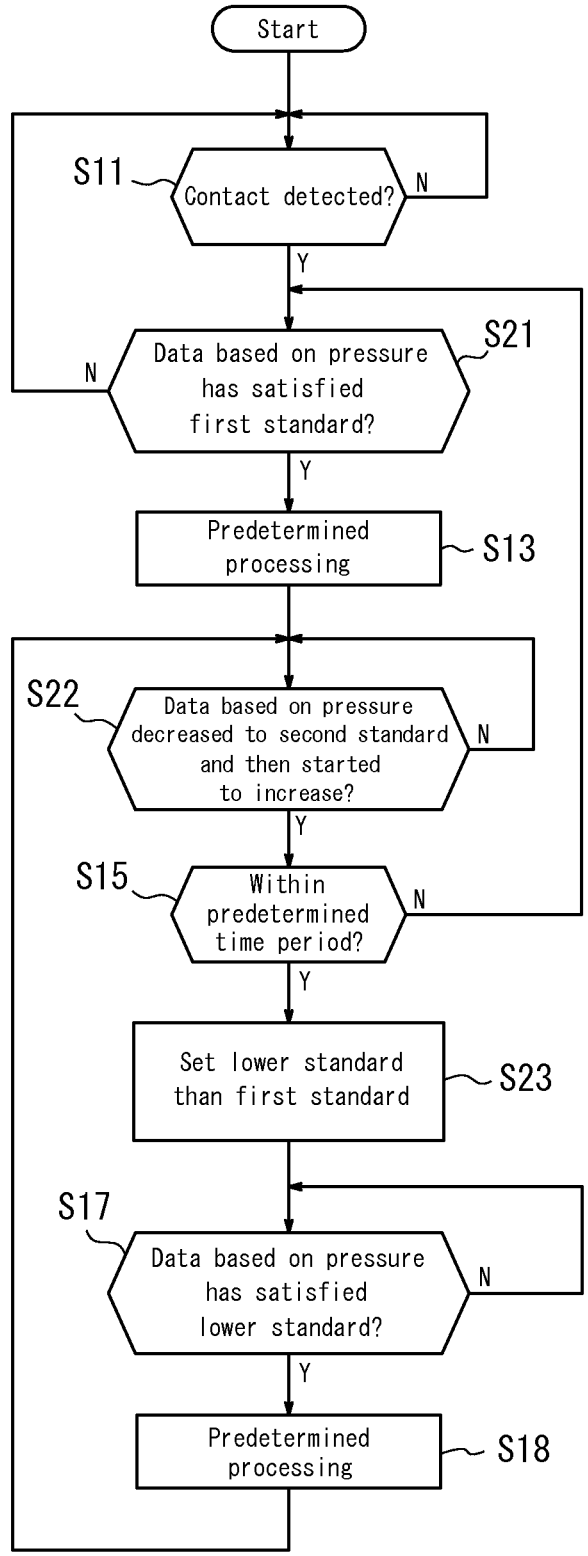
FIG. 7 is a flowchart illustrating processing performed by an electronic device according to the third embodiment.

FIG. 7 is a flowchart illustrating an example of processing performed by the electronic device according to the third embodiment. FIG. 7 differs from the flowchart described with reference to FIG. 3 in that the processing pertaining to steps S12, S14, and S16 illustrated in FIG. 3 is modified. The remaining processing is performed similarly to the processing performed by the electronic device according to the first embodiment.

Figure 8:
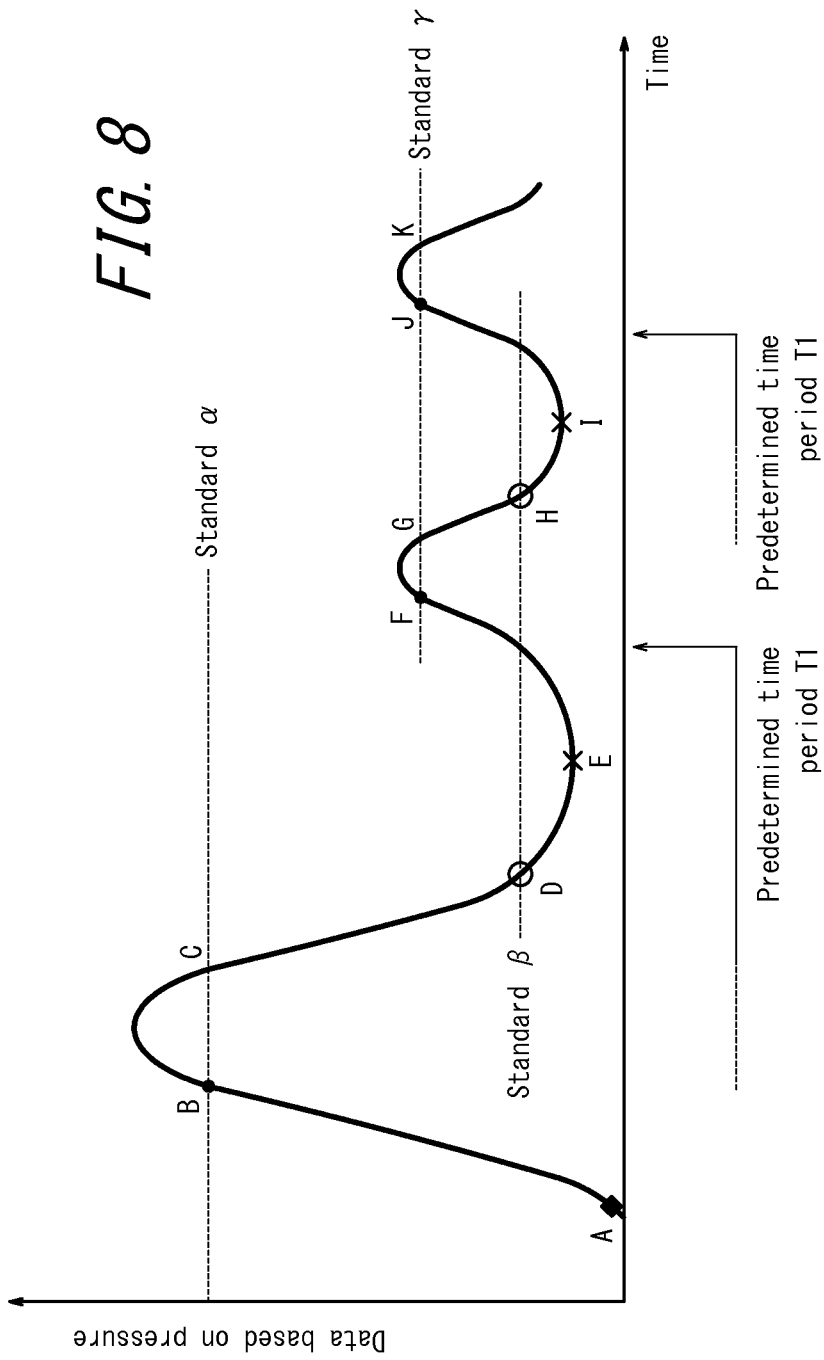
FIG. 8 illustrates processing in accordance with changes in data based on pressure detected by a pressure detection unit of the electronic device according to the third embodiment.

FIG. 8 illustrates processing in accordance with changes in data based on pressure detected by the electronic device according to the present embodiment. In FIG. 8 also, various reference signs has similar meanings as those described in FIG. 4.

In the present embodiment, when the first contact is detected in step S11, the control unit 11 determines whether the data based on the pressure detected by the pressure detection unit 13 has satisfied the first standard ($\alpha$) (step S21). Note that the "first standard" is similar to the predetermined standard described in the first embodiment. When it is determined that the first standard ($\alpha$) has been satisfied in step S21, the control unit 11 performs control for carrying out the predetermined processing (step S13). In FIG. 8, the first contact is detected at the time point A, and the first standard ($\alpha$) is satisfied in the time point B, and as a result, the predetermined processing is carried out.

After the predetermined processing was performed in step S13, the control unit 11 determines whether the data based on the pressure detected by the pressure detection unit 13 decreased to the second standard and then started to increase (step S22). In FIG. 8, the second standard is indicated by the standard $\beta$. In this way, the second standard ($\beta$) is set to be a lower standard than the first standard ($\alpha$) in advance.

When it is determined in step S22 that the data based on the pressure decreased to the second standard and then started to increase, the control unit 11 determines whether the time point at which the data switched from decrease to increase is within the predetermined time period (step S15). When it is determined that the time point at which the data switched from decrease to increase is within the predetermined time period in step S15, the control unit 11 sets a lower standard than the first standard so that the predetermined processing is carried out according to the lower standard (step S23). In FIG. 8, the lower standard set in step S23 is indicated by the standard $\gamma$. After step S23, when it is determined that the data based on the pressure detected by the pressure detection unit 13 has satisfied the lower standard that is set in step S17, the control unit 11 performs control for carrying out the predetermined processing (step S18).

In FIG. 8, the data based on the pressure decreases to the second standard ($\beta$) at the time point D and then starts to increase at the time point E. Since the time point E at which the data based on the pressure switches from decrease to increase is within the predetermined time period T1, the predetermined processing is carried out when the data based on the pressure satisfies the lower standard (γ). In the example illustrated in FIG. 8, at the time point F at which the lower standard (γ) is satisfied, the predetermined processing is carried out. Furthermore, the data based on the pressure decreases to the second standard (β) at the time point H again and then starts to increase at the time point I. Here, the time point I is within another predetermined time period T1, and as a result, the predetermined processing is carried out at the time point J because at this time point J the data based on the pressure satisfies the lower standard (γ).

As described above, the third embodiment is, similarly to the first embodiment, such that the control unit 11 performs control so that the predetermined processing is carried out when the data based on the pressure detected by the pressure detection unit 13 satisfies the first standard. However, in the third embodiment, when the data based on the pressure detected by the pressure detection unit 13 decreased to the second standard and then started to increase within the predetermined time period after the predetermined processing was performed, the control unit 11 performs control so that the predetermined processing is carried out when the data based on the pressure satisfies the lower standard than the first standard. As illustrated in FIG. 8, it is to be noted that in the present embodiment the second standard (β) is set in advance as the standard that is lower than the first standard (α) and yet lower than the lower standard (γ) that is set.

Consequently, with the electronic device 10 according to the third embodiment also, the operator is able to perform a subsequent operation by applying a less amount of (smaller) pressure than in the operation for which the operator made a contact for the first time. As a result, with the electronic device 10 according to the present embodiment, the predetermined processing is prevented from being carried out in accordance with an unintentional operation by the operator, and the burden to the operator for the operation is reduced.

Furthermore, with the electronic device 10 according to the third embodiment, after the predetermined processing was carried out for the first time, subsequently the predetermined processing may be performed without detecting another contact, i.e., without turning the data based on the pressure to zero temporarily. Consequently, after performing an operation for which the operator made a contact for the first time, the operator is able to quickly carry out the predetermined processing consecutively simply by repeating operations of strengthening and weakening the pressing force without the need for lifting the finger or the like out of contact with the contact detection unit 16.

Fourth Embodiment

Next, the fourth embodiment of the present invention will be described.

In the fourth embodiment, the control unit 11 included in the electronic device 10 according to the above-described first to the third embodiment is modified to control the tactile sensation providing unit 14 to provide a tactile sensation. In this circumstance, it is also preferable to control display performed by the display unit 17.

In detail, when the predetermined conditions according to the first to the third embodiment are satisfied within the predetermined time period after the predetermined processing was carried out for the first time in the electronic device 10, as with the first to the third embodiment, the electronic device according to the fourth embodiment performs the (subsequent) predetermined processing. Besides, when the data based on the pressure satisfies a predetermined standard, the electronic device according to the fourth embodiment provides a tactile sensation. In this circumstance, it is preferable for the electronic device according to the fourth embodiment to display, upon detection of a contact to a predetermined object displayed on the display unit 17, that such the object is selected. It is also preferable for the electronic device according to the fourth embodiment to display, when the data based on the pressure satisfies the predetermined standard while the contact to the object is being detected, that the selection of the object is determined Note that the "contact to the predetermined object" actually refers to a contact made to the contact detection unit 16 in a position corresponding to an area of the predetermined object displayed on the display unit 17. Yet, such a contact is hereinafter abbreviated as the "contact to the predetermined object" as appropriate.

Except for the above point, the electronic device according to the fourth embodiment may be embodied by using basically the same configuration and control as the electronic device described in the first to the third embodiment. Therefore, a description of the same or similar parts as in the first to the third embodiment is omitted as appropriate.

Figure 9:
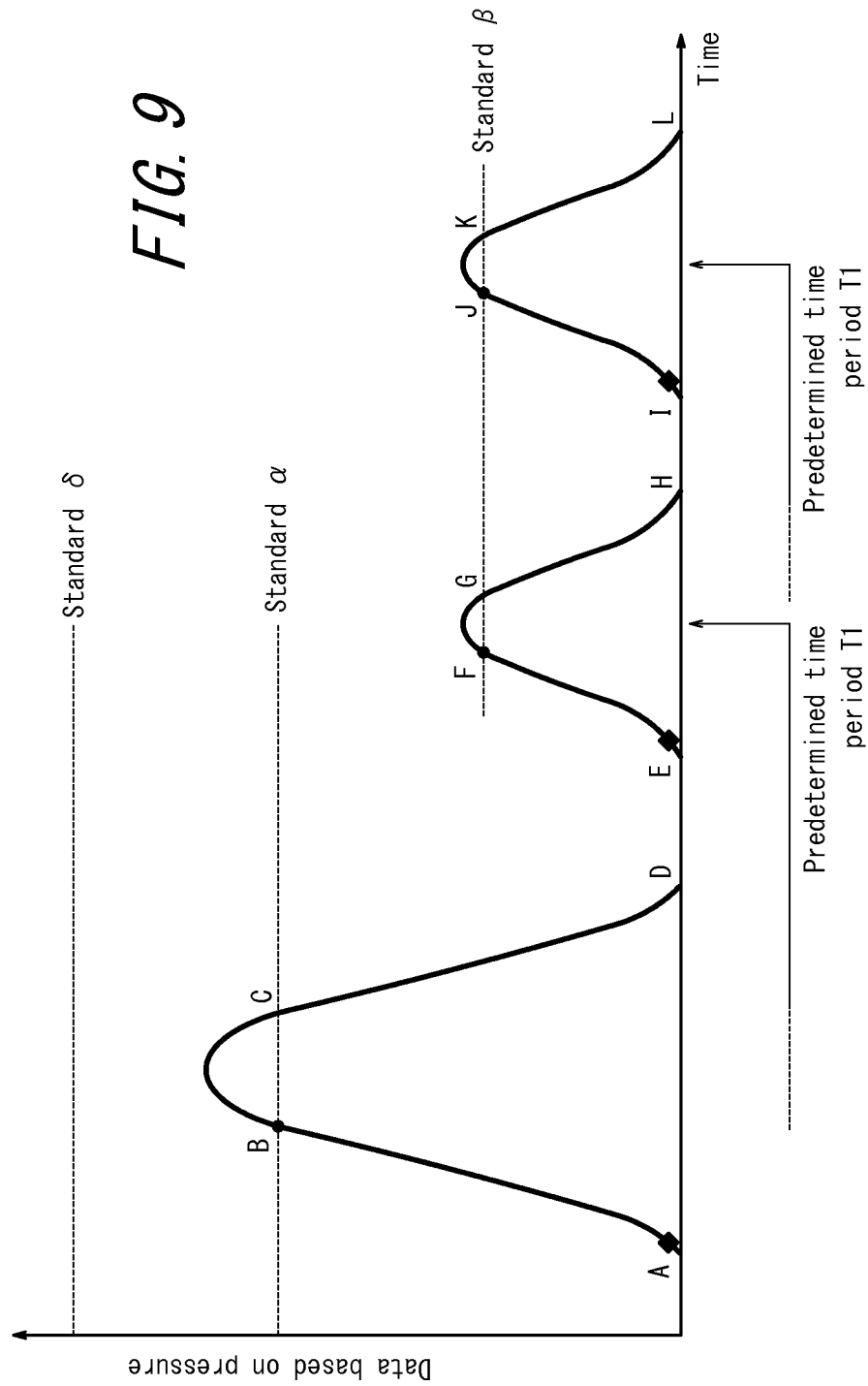
FIG. 9 illustrates processing in accordance with changes in data based on pressure detected by a pressure detection unit of an electronic device according to the fourth embodiment.

FIG. 9 illustrates processing in accordance with changes in data based on pressure detected by the electronic device according to the fourth embodiment. In FIG. 9 also, various reference signs has similar meanings as those described in FIG. 4.

As illustrated in FIG. 9, in the fourth embodiment, the tactile sensation providing standard is set higher than the predetermined standard (α), that is, the standard that the data based on the pressure is to satisfy in order for the predetermined processing to be carried out in accordance with the first operation. The "tactile sensation providing standard" herein refers to the standard set in order for the tactile sensation providing unit 14 to provide the tactile sensation in response to detection of the data based on the pressure satisfying the standard. In FIG. 9, the tactile sensation providing standard is represented by the standard δ. In the fourth embodiment, when the data based on the pressure detected by the pressure detection unit 13 satisfies the tactile sensation providing standard (δ), the predetermined tactile sensation is provided in order to notify the operator that the standard (δ) is satisfied.

In FIG. 9, although the data based on the pressure satisfies the predetermined standard (α), the data does not satisfy the tactile sensation providing standard (δ). Accordingly, in the above circumstance, although the predetermined processing in accordance with the first operation is carried out, the tactile sensation is not provided then. If the first contact is made by applying a greater amount of (stronger) pressure than the case of the curved line illustrated in FIG. 9, it is assumed that the data satisfies the tactile sensation providing standard (δ) straight after satisfying the predetermined standard (α). In the above circumstance, the predetermined processing is carried out in accordance with the operation for which the contact is made, and the tactile sensation is provided then. Consequently, the operator is able to recognize that the electronic device 10 carries out the predetermined processing even when the operator does not stare at the display unit 17.

After that, processing as with the first to the third embodiment is performed. That is, when the fourth embodiment is applied to the first embodiment, as illustrated in FIG. 9, after the predetermined processing was carried out in accordance with the first operation, the predetermined processing is carried out according to the lower standard than the predetermined standard based on another contact detected within the predetermined time period. Furthermore, when the fourth embodiment is applied to the second embodiment, after the predetermined processing was carried out in accordance with the first operation, the predetermined processing is carried out based on another contact detected within the predetermined time period. Moreover, when the fourth embodiment is applied to the third embodiment, after the predetermined processing was carried out in accordance with the first operation, the predetermined processing is carried out according to the lower standard than the standard at which the predetermined processing was carried out in accordance with the first operation when the data based on the pressure decreased to the predetermined and started to increase within the predetermined time period.

Figure 10:
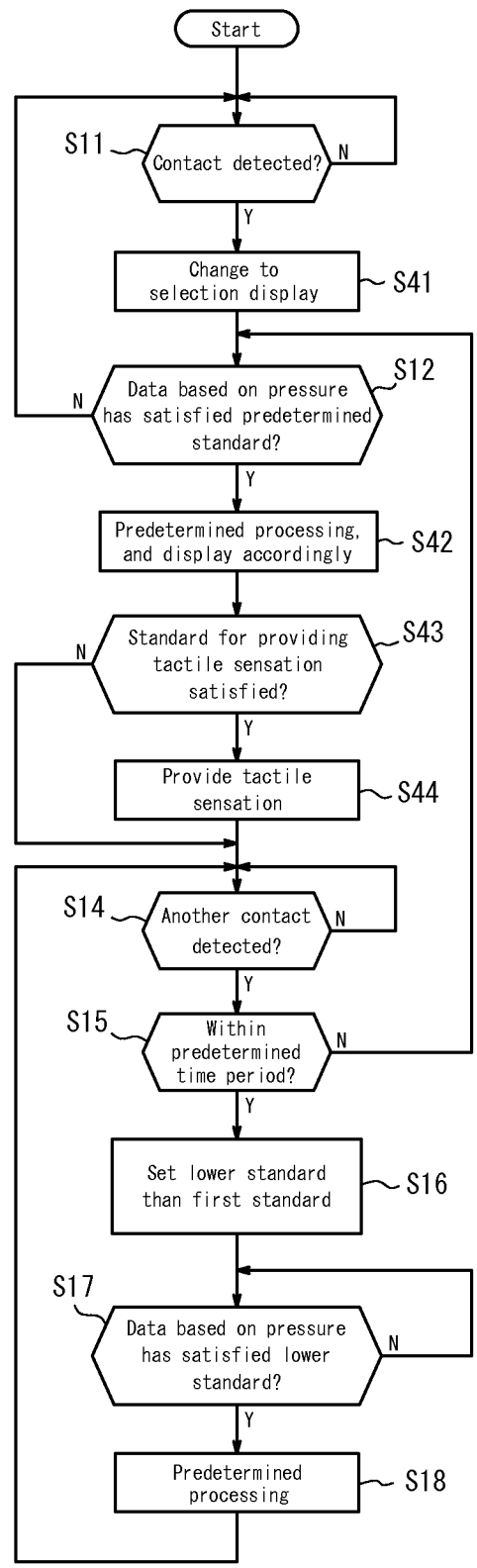
FIG. 10 is a flowchart illustrating processing performed by the electronic device according to the fourth embodiment.

FIG. 10 is a flowchart illustrating an example of processing performed by the electronic device according to the fourth embodiment. In FIG. 10, as an example, the flowchart in which the fourth embodiment is applied to the first embodiment is presented. However, the flowchart in which the fourth embodiment is applied to the second or the third embodiment may be easily obtained by applying FIG. 10 accordingly.

Although a description is given below of the processing according to the fourth embodiment with reference to FIG. 10, the description is focused on points different from the flowchart illustrating the processing according to the first embodiment as described with reference to FIG. 3.

After the processing according to the fourth embodiment is started, when it is determined that a contact has been detected by the contact detection unit 16 in step S11, the control unit 11 controls the display unit 17 to display that the object corresponding to a position at which the contact was detected is selected (step S41). For example, in step S41, when the contact detection unit 16 detects that the operator contacted the object such as a key or the like displayed on the display unit 17, it is displayed that the key or the like is selected.

FIGS. 11A-11C illustrate examples of the processing performed by the electronic device according to the fourth embodiment. Displaying that the object is selected as performed in step S41 may be, for example, illustrated by the display unit 17 on the touch panel 12 included in the electronic device 10 of FIG. 11A. In FIG. 11A, the operator has contacted the "TUV" key object by the finger, and consequently, it is displayed that the key object is selected.

When it is displayed that the selection is made in step S41, the control unit 11 determines whether the data based on the pressure detected by the pressure detection unit 13 has satisfied the predetermined standard (α) (step S12).

When it is determined that the predetermined standard (α) has been satisfied in step S12, the control unit 11 performs control for carrying out the predetermined processing (step S42). In step S42, the control unit 11 also controls the display unit 17 to display that the predetermined processing is carried out (step S42). In this regard, in step S42, the control unit 11 may control the display unit 17 to display, for the object such as the key or the like that was displayed to be selected in step S41, that the selection of the object is determined That is to say, in step S42, when the data based on the pressure satisfies the predetermined standard (α), in response to the contact made by the operator to the object such as key or the like displayed on the display unit 17, it is displayed that the key or the like is pressed (e.g. that the key is depressed), for example.

Displaying that the predetermined processing is carried out as performed in step S42 may be, for example, illustrated by the display unit 17 on the touch panel 12 included in the electronic device 10 of FIG. 11B. In FIG. 11B, in response to the contact made to the "TUV" key object, the predetermined processing in accordance with the contact is carried out, and it is displayed that the key object is pressed (depressed). In step S42, in accordance with the contact, the predetermined processing associated with the object for which the contact was detected is carried out. For example, as illustrated in FIG. 11B, another character corresponding to the object that was pressed is displayed on the display unit 17. In FIG. 11B, in response to the contact made to the "TUV" key object, the predetermined processing is performed, and the first letter "T" of "TUV" is displayed on the display unit 17. Consequently, the operator is able to recognize that the predetermined processing is carried out by looking at the display on the display unit 17.

After step S42, the control unit 11 determines whether the data based on the pressure detected by the pressure detection unit 13 has satisfied the tactile sensation providing standard (δ) (step S43). When it is determined that the data based on the pressure has satisfied the tactile sensation providing standard (δ) in step S43, the control unit 11 controls the tactile sensation providing unit 14 to provide the tactile sensation indicating that the predetermined processing is carried out (step S44). Note that the "tactile sensation indicating that the predetermined processing is carried out" herein is preferably an imitation of a tactile sensation provided when the operator presses the key or the like, and any other tactile sensations generated by vibration may also be used.

When the tactile sensation is provided in step S44, as illustrated in FIG. 11C, for example, the display on the display unit 17 does not change from the state illustrated in FIG. 11B. Then, in the above state in step S44, the tactile sensation providing unit 14 provides the tactile sensation to the operator, thereby allowing the operator to recognize that the predetermined processing is carried out. It is to be noted that in step S44 the operator is able to recognize that the predetermined processing is carried out in accordance with the operation of the operator by the provided tactile sensation even when the operator does not look at the display unit 17.

When the tactile sensation has been provided in step S44, the control unit 11 proceeds to the subsequent step S14, and continues the subsequent processing. On the other hand, when the data based on the pressure does not satisfy the tactile sensation providing standard (δ) in step S43, the control unit 11 does not go through step S44 and moves to step S14.

Meanwhile, the determination in S43 as to whether the data based on the pressure has satisfied the tactile sensation providing standard (δ) is performed as follows. That is to say, by the control unit 11 monitoring the pressure detected by the pressure detection unit 13, the determination is performed based on a history of changes in the data based on the pressure. The history of changes in the data based on the pressure may be stored in the storage unit 15. For example, in FIG. 9, depending on the changes in the data based on the pressure after the predetermined standard (α) is satisfied in the time point B and before it is determined that predetermined standard (α) is not satisfied anymore in the time point C, it may be determined whether the data has reached the tactile sensation providing standard (δ). In other words, whether or not to provide the tactile sensation is determined by determining whether, after the predetermined standard (α) was satisfied, the tactile sensation providing standard (δ) was satisfied and then the predetermined standard (α) became not satisfied anymore or, after the predetermined standard (α) was satisfied, the tactile sensation providing standard (δ) was not satisfied and then the predetermined standard (α) became not satisfied anymore.

Thus, in accordance with the fourth embodiment, the electronic device 10 is further provided with the tactile sensation providing unit 14 configured to vibrate the contact surface of the contact detection unit 16. Furthermore, in the fourth embodiment, when the data based on the pressure detected by the pressure detection unit 13 has satisfied the tactile sensation providing standard set higher than the predetermined standard, the control unit 11 controls the tactile sensation providing unit 14 to provide the tactile sensation to the contacting object that is in contact with the contact surface of the contact detection unit 16. The "predetermined standard" herein is described in correspondence with the first and the second embodiment, and the "predetermined standard" is read as the "first standard" in the third embodiment.

Furthermore, in the fourth embodiment, the control unit 11 performs the processing according the first embodiment, and when the contact detection unit 16 detects another contact within the predetermined time period after the predetermined processing was carried out, the control unit 11 performs control so that the predetermined processing is carried out when the data based on the pressure satisfies the lower standard than the predetermined standard. Corresponding to the second embodiment, the control 11 in the fourth embodiment performs the processing according to the second embodiment and also performs the following processing. That is to say, when the contact detection unit 16 detects another contact within the predetermined time period after the predetermined processing was carried out while the data based on the pressure has not satisfied the tactile sensation providing standard, the control unit 11 performs control for carrying out the predetermined processing. In order to correspond to the third embodiment, the control 11 in the fourth embodiment performs the processing according to the third embodiment and also performs the following processing. That is to say, when the data based on the pressure decreased to the second standard and then started to increase within the predetermined time period after the predetermined processing was performed, the control unit 21 performs control so that the predetermined processing is carried out when the data based on the pressure satisfies the lower standard than the first standard.

Consequently, with the electronic device 10 according to the fourth embodiment also, the similar advantageous effect to that of the first to the third embodiment is provided.

Next, a description is given of an advantageous effect provided by the electronic device according to the fourth embodiment.

According to the present embodiment, the operator is able to recognize from the tactile sensation that the predetermined processing is started by the data based on the pressure satisfying the tactile sensation providing standard (δ) even when the operator does not look at the display unit 17.

Without looking at the display unit 17, the operator is not able to recognize from changes in display on the display unit 17 that the predetermined processing is initiated. Therefore, when not looking at the display unit 17, the operator is likely to increase the pressure for the operation until the operator may recognize from the tactile sensation that the predetermined processing is initiated.

On the other hand, when looking at the display unit 17, the operator is able to recognize from the changes in display on the display unit 17 that the predetermined processing is initiated. That is to say, when looking at the display unit 17, the operator recognizes from the changes on the display unit 17 that the predetermined processing is initiated before the operator recognizes from the tactile sensation that the predetermined processing is initiated, and accordingly, the operator is likely to weaken the pressure at the time of the recognition. In this case, the tactile sensation is not provided by the tactile sensation providing unit 14.

Thus, when the operator is not considered to look at the display unit 17, the present embodiment makes it possible to make the operator clearly recognize from the tactile sensation that the predetermined processing is initiated. On the other hand, when the operator is considered to look at the display unit 17, the present embodiment makes it possible to make the operator to clearly recognize that the predetermined processing is initiated without providing the tactile sensation. Consequently, the present embodiment provides advantageous effects of reducing power consumption required for the tactile sensation providing unit 14 to provide the tactile sensation while reducing the risk of erroneous operation. Furthermore, with the present embodiment also, the operator is able to perform a subsequent operation by applying a less amount of (smaller) pressure than in the operation for which the operator made a contact for the first time, and therefore, the burden to the operator for the operation is reduced.

Fifth Embodiment

The fifth embodiment modifies the processing performed by the control unit 11 included in the electronic device 10 according to the above-described first to the third embodiment. Preferably, when an operation is made by contacting the same key object and when an operation is made by contacting different key objects in the electronic device 10, as with the first embodiment, an electronic device according to the fifth embodiment changes the aforementioned predetermined time period.

Figure 12A:
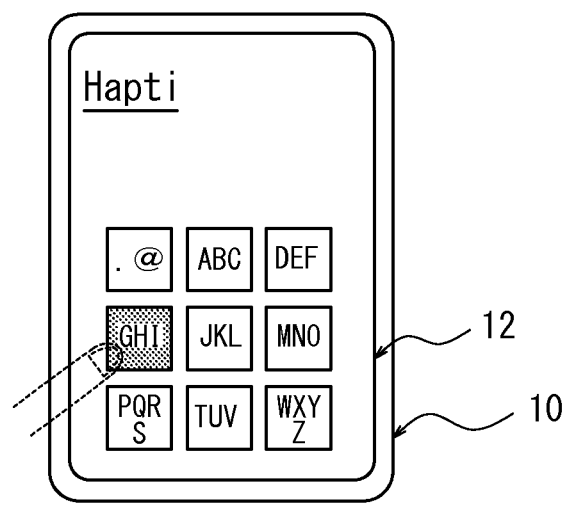
FIGS. 12A-12B illustrate concrete examples of processing performed by an electronic device according to the fifth embodiment.

For example, when the operator makes an operation for displaying a character or the like by the multi-tap type operation as described above, it is generally often the case that the same key is consecutively pressed, i.e., contacts are made to the same key object many times consecutively. For example, as illustrated in FIG. 12A, a description is given of a case where, after causing the electronic device 10 to display the characters "Hapt", the operator makes an operation for displaying the character "i". In this case, by making an operation of contacting the "GHI" key object displayed on the display unit 17 three consecutive times, the operator is able to cause the character "i" to be displayed after the characters "Hapt".

Figure 12B:
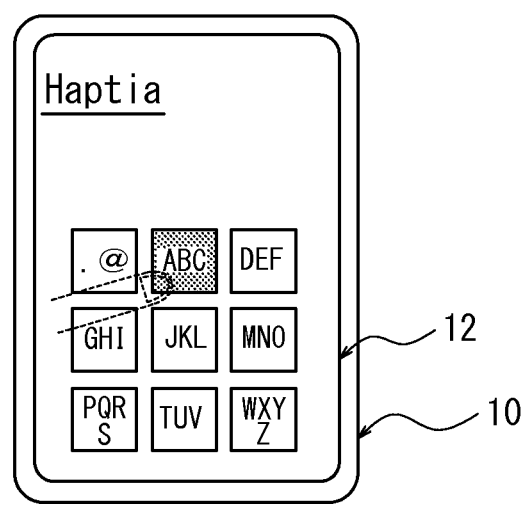

Additionally, after the certain character was displayed by the consecutive contacts made to the same key object, it is often the case that an operation of contacting another key object (i.e. contacting an object located in another position) for an operation for displaying another character. For example, as illustrated in FIG. 12A, when the operator makes an operation for causing the character "c" to be displayed after the characters "Hapti" were displayed in the electronic device 10, it is necessary for the operator to further make an operation to contact the "ABC" key object displayed on the display unit 17 three consecutive times. At this time, when the operator contacts the "ABC" key object by moving the finger from the state illustrated in FIG. 12A to the position illustrated in FIG. 12B, a time interval required for performing the operation of contacting the object is longer than a time interval required for contacting the same position several consecutive times is made as illustrated in FIG. 12A.

In view of the above, in the fifth embodiment, when a subsequent operation is made after the initial predetermined processing was performed, if the position at which the contact is made differs from the position at which the previous contact was made, the "predetermined time period", namely, the time limit by which the predetermined standard is to be lowered is set somewhat longer.

Figure 13:
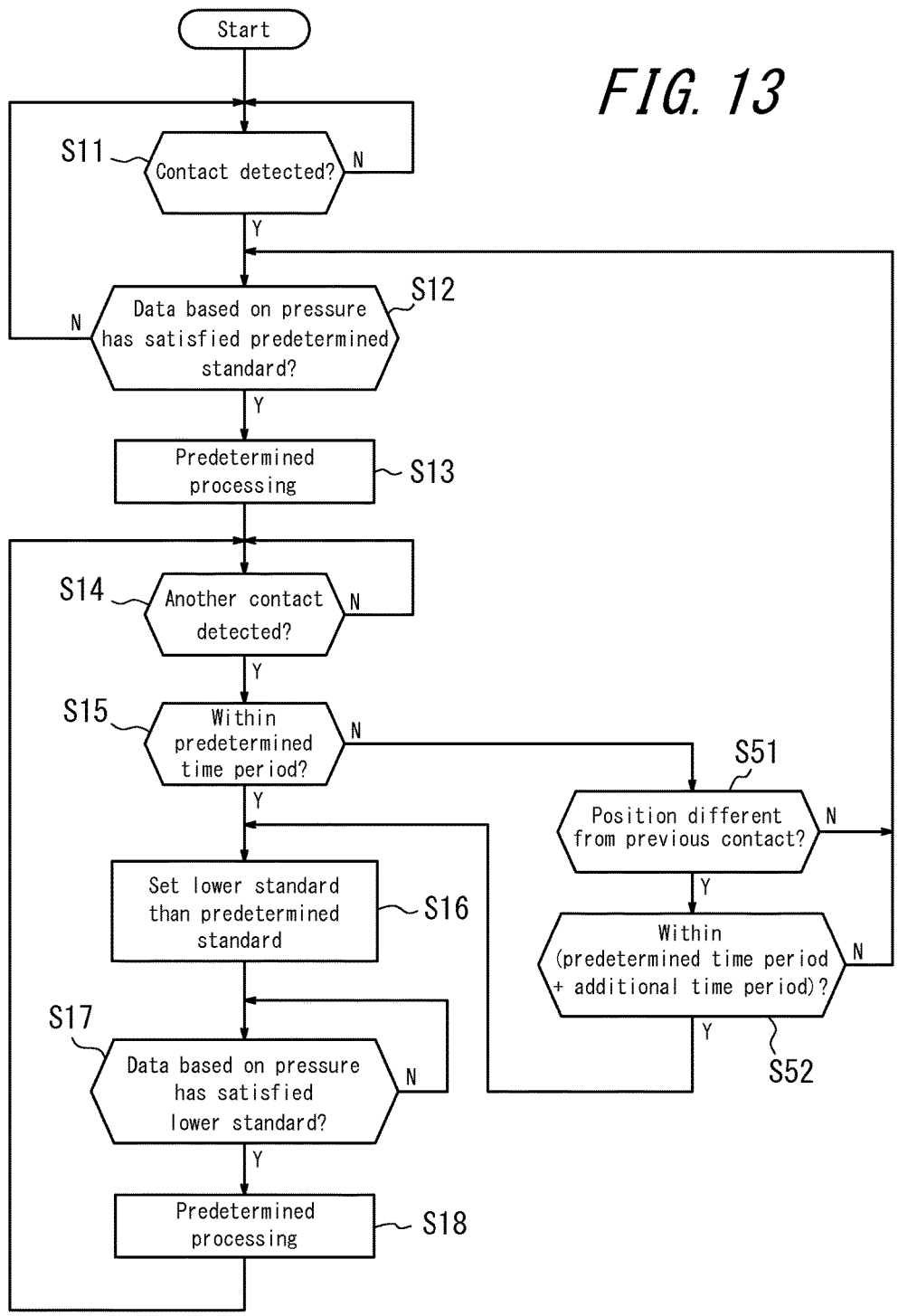
FIG. 13 is a flowchart illustrating the processing performed by the electronic device according to the fifth embodiment.

FIG. 13 is a flowchart illustrating an example of processing performed by the electronic device according to the fifth embodiment. In FIG. 13, as an example, the flowchart in which the fifth embodiment is applied to the first embodiment is presented. However, the flowchart in which the fifth embodiment is applied to the second or the third embodiment may be easily obtained by applying FIG. 13 accordingly.

Although a description is given below of the processing according to the fifth embodiment with reference to FIG. 13, the description is focused on points different from the flowchart according to the first embodiment as described with reference to FIG. 3.

The fifth embodiment is the same as the first embodiment in that, after the predetermined processing was performed in step S13, the contact detection unit 16 determines whether another contact has been detected in step S14.

When it is determined that the other contact has been detected in step S14, it is determined whether detection of the other contact occurred within the predetermined time period in step S15, and when the other contact was detected within the predetermined time period, the processing proceeds to step S16. The subsequent processing is adapted from the first embodiment.

On the other hand, when the other contact was not detected within the predetermined time period (i.e. after the predetermined time period) in step S15, the control unit 11 performs processing of step S51. That is to say, in step S51, the control unit 11 determines whether the position at which the other contact was detected differs from the position at which the previous contact (in the example, the first contact) was detected. The determination as to whether or not the "position" at which the contact was detected differs preferably refers to determination as to whether or not a contact made to another object has been detected.

In step S51, when the position at which the other contact was detected does not differ from the position at which the previous contact was detected, i.e., when these contacts were made to the same key object, the control unit 11 returns to step S12 and performs the same processing as in the first embodiment. That is to say, in the above circumstance, since the consecutive contacts were made to the same key object, when the other contact was not detected within the predetermined time period, the predetermined processing is performed not according to the lower standard but according to the original predetermined standard.

On the other hand, in step S51, when the position at which the other contact was detected differs from the position at which the previous contact was detected, i.e., when these contacts were made to different key objects, the control unit 11 performs the processing of step S52. In step S52, the control unit 11 determines whether the detection of the other contact by the contact detection unit 16 occurred within a time period obtained by adding a predetermined additional time period to the aforementioned predetermined time period.

In step S52, when determining it is within the time period obtained by adding the predetermined additional time period to the aforementioned predetermined time period that the other contact was detected by the contact detection unit 16, the control unit 11 moves to step S16 and performs the subsequent processing. That is to say, in step S52, even when the predetermined time period had elapsed in the time point at which the other contact was detected, if the time point is within the time period obtained by adding the predetermined additional time period to the aforementioned predetermined time period, the predetermined processing is performed according to the lower standard.

On the other hand, in step S52, when determining it is not within the time period obtained by adding the predetermined additional time period to the aforementioned predetermined time period that the other contact was detected, the control unit 11 proceeds to step S12 and performs the subsequent processing. That is to say, in this case, because, although the contact was made to the different key objects, a considerable time period elapsed before the detection of the other contact, the predetermined processing is performed not according to the lower standard but according to the original predetermined standard. Accordingly, it is preferable to set the aforementioned "predetermined additional time period" based on a temporal threshold value with which determination is made as to whether the operation of consecutively contacting an object was made to the same object or the different objects.

Thus, in the fifth embodiment, the control unit 11 performs the processing according to the first embodiment, and when the contact detection unit 16 has detected the other contact in the position different from the position at which the previous contact was detected, if the detection of the other contact occurred within the time period obtained by adding the predetermined additional time period to the predetermined time period, the control unit 11 performs control so that the predetermined processing is performed when the data based on the pressure satisfies the lower standard than the predetermined standard. Corresponding to the second embodiment, the control 11 in the fifth embodiment performs the processing according to the second embodiment and also performs the following processing. That is to say, the control unit 11 performs the processing according to the second embodiment, and when the contact detection unit 16 has detected the other contact in the position different from the position at which the previous contact was detected, if the detection of the other contact occurred within the time period obtained by adding the predetermined additional time period to the predetermined time period, the control unit 11 performs control so that the predetermined processing is performed. Furthermore, corresponding to the third embodiment, the control 11 in the fifth embodiment performs the processing according to the third embodiment and also performs the following processing. That is to say, when the position of the contact detected by the contact detection unit 16 when the predetermined was carried out differs from the position of the contact detected by the contact detection unit 16 when the data based on the data decreased to the second standard and then started to increase, if the detection occurred within the time period obtained by adding the predetermined additional time period to the predetermined time period, the control unit 11 performs control so that the predetermined processing is performed when the data based on the pressure satisfies the lower standard than the first standard.

Consequently, with the electronic device 10 according to the fifth embodiment also, the advantageous effect similar to that of the first to the third embodiment is provided. Besides, in the fifth embodiment, in response to the operation of contacting different key objects consecutively, it is considered that the key objects are located away from each other, and the aforementioned predetermined time period is changed. As a result, the fifth embodiment makes it possible to further improve usability of the electronic device according to the first to the third embodiment.

Note that the present invention is not limited to the above embodiment, and a variety of modifications and changes are possible. For example, in the descriptions of the processing of the above embodiments, it is assumed that the electronic device is a mobile terminal such as a mobile phone. However, the electronic device of the present invention is not limited to the mobile terminal such as the mobile phone and is applicable to a variety of electronic devices. Furthermore, processing of a variety of configurations may be adopted as the processing performed by the electronic device according to the embodiments as long as the processing is logically consistent. For example, the order of the processing may, of course, be appropriately rearranged. For example, the flowcharts described in the embodiments merely illustrate some preferable examples of the embodiments of the present invention. Accordingly, a variety of configurations are possible, for example by modifying the order of the processing, adding the tactile sensation to be provided, or making the operator recognize by sound how the processing is proceeding.

Moreover, in the above embodiments, the contact detection unit 16 is used to detect a contact to the contact surface of the contact detection unit 16. That is to say, in the descriptions of the embodiments, it is assumed that the "contact detection unit 16" is a member such as a so-called touch sensor. However, any contact detection unit 16 may be used in the electronic device according to the present invention as long as a contact made by the contacting object may be detected.

Moreover, in the above embodiments, the contact detection unit 16 is used to detect a contact to the contact surface of the contact detection unit 16. However, it is possible to detect loads of the pressure applied to the contact detection unit 16 and determine that a contact has been made to the contact detection unit 16 when data based on the detected pressure satisfies the predetermined standard. When such loads are detected, it is assumed that any number of strain gauge sensors or the like may be provided to the contact detection unit 16, and by detecting strain of the contact detection unit 16 due to the pressure, the loads of the pressure applied to the contact detection unit 16 are calculated from the strain. Additionally, the detection of the loads may, of course, be performed by the pressure detection unit 13.

Various configurations are possible for the detection of the loads, according to the type of the contact detection employed in the contact detection unit 16. For example, in the case of a resistive film type, if the loads may be detected from changes in output signal based on changes in resistance depending on the contact area, the pressure detection unit may be configured without using the strain gauge sensors. Alternatively, in the case of a capacitive type, if the loads may be detected from the changes in output signal based on changes in capacitance, the pressure detection unit may also be configured without using the strain gauge sensors.

The tactile sensation providing unit 14 may be configured by using any number of piezoelectric elements, by providing translucent piezoelectric elements on the entire surface of the contact detection unit 16, or by causing an eccentric motor to rotate at a rate of one rotation per period of the drive signal.

In the descriptions of the above embodiments, it is assumed that the contact detection unit 16 is superposed over a front surface side of the display unit 17. However, the electronic device according to the present invention is not limited to the above structure, and the contact detection unit 16 may be spaced apart from the display unit 17. However, superposing the contact detection unit 16 over the front surface side of the display unit 17 would facilitate it to make the operator recognize a correspondence relation between a displayed image, and the predetermined processing that is carried out and a vibration that is generated.

The display unit 17 and the contact detection unit 16 may be constituted as an integrated device, for example, by providing a common substrate with functions of both the display unit and the contact detection unit. One example of the device integrating the functions of both the display unit and the contact detection unit includes the one in which a plurality of photoelectric conversion elements such as photodiodes are regularly mixed into a pixel electrode group of a liquid crystal panel that is arranged in a matrix. Such a device is capable of displaying an image according to a liquid crystal panel structure and is also capable of detecting a touch position by reflecting back light for the liquid crystal display with a head of a pen used for inputting, by touch, a desired position on the panel surface so that neighboring photoelectric conversion elements receive the reflected back light.

The tactile sensation providing unit 14 may be configured to indirectly vibrate the contact detection unit 16 by vibrating the electronic device based on a vibrating motor (eccentric motor) or the like, or may be configured to directly vibrate the contact detection unit 16 by providing the piezoelectric elements in the contact detection unit 16.

In the descriptions of the above embodiments, the technical meaning of expressions such as, for example, data based on the pressure satisfying the standard, greater than or equal to the threshold value, or less than the threshold value, is not necessarily precise in a mathematical sense. In accordance with the specifications of the electronic device, these expressions encompass the cases both of including and of not including the value representing the standard. For example, satisfying the standard (greater than or equal to the threshold value) may refer not only to the case of the data based on the pressure reaching the value representing the standard (threshold value), but also the case of exceeding the value representing the standard. Furthermore, less than the threshold value, for example, may refer not only to the case of the data based on the pressure falling below the value representing the standard, but also the case of reaching the threshold value of the loads, i.e. of being less than or equal to the value representing the standard.

REFERENCE SIGNS 10 electronic device
11 control unit
12 touch panel
13 pressure detection unit
14 tactile sensation providing unit
15 storage unit
16 contact detection unit
17 display unit

The invention claimed is:

1. An electronic device comprising:
   a contact detection unit configured to detect a contact made by a contacting object on a display portion;
   a pressure detection unit configured to detect pressure applied to the contact detection unit, the contact detection unit being configured to detect the contact made by the contacting object as a selection on the display portion on which the contact was made when data based on the pressure detected by the pressure detection unit satisfies a selection standard; and
   a control unit configured to perform control so that predetermined processing is carried out on a selected display portion to which the selection was detected when the data based on the pressure detected by the pressure detection unit satisfies a predetermined standard higher than the selection standard, wherein
   when the contact detection unit detects another contact within a predetermined time period after the predetermined processing being carried out on the selected display portion, the control unit performs control so that the predetermined processing is carried out when the data based on the pressure satisfies a standard lower than the predetermined standard and higher than the selection standard.

2. An electronic device comprising:
   a contact detection unit configured to detect a contact made by a contacting object on a display portion;
   a pressure detection unit configured to detect pressure applied to the contact detection unit, the contact detection unit being configured to detect the contact made by the contacting object as a selection on the display portion on which the contact was made when data based on the pressure detected by the pressure detection unit satisfies a selection standard; and
   a control unit configured to perform control so that predetermined processing is carried out on a selected display portion to which the selection was detected when the data based on the pressure detected by the pressure detection unit satisfies a predetermined standard higher than the selection standard, wherein
   when the contact detection unit detects another contact within a predetermined time period after the predetermined processing being carried out on the selected display portion, the control unit performs control so that the predetermined processing is carried out.

3. The electronic device of claim 1, further comprising:
   a tactile sensation providing unit configured to vibrate a contact surface of the contact detection unit, wherein
   the control unit controls the tactile sensation providing unit to provide a tactile sensation to the contacting object that is in contact with the contact surface when the data based on the pressure detected by the pressure detection unit satisfies a tactile sensation providing standard that is set higher than the predetermined standard, and
   when the contact detection unit detects the other contact without the data based on the pressure satisfying the tactile sensation providing standard within the predetermined time period after the predetermined processing being carried out, the control unit performs control so that the predetermined processing is carried out when the data based on the pressure satisfies the lower standard than the predetermined standard.

4. The electronic device of claim 1, wherein
   when the contact detection unit detects the other contact in a position different from a position of the previous contact, the control unit performs control so that the predetermined processing is carried out when the data based on the pressure satisfies the lower standard than the predetermined standard within a time period obtained by adding a predetermined additional time period to the predetermined time period.

5. An electronic device comprising:
   a contact detection unit configured to detect a contact made by a contacting object on a display portion;
   a pressure detection unit configured to detect pressure applied to the contact detection unit, the contact detection unit being configured to detect the contact made by the contacting object as a selection on the display portion on which the contact was made when data based on the pressure detected by the pressure detection unit satisfies a selection standard; and
   a control unit configured to perform control so that predetermined processing is carried out on a selected display portion to which the selection was detected when the data based on the pressure detected by the pressure detection unit satisfies a first standard higher than the selection standard, wherein
   when the data based on the pressure detected by the pressure detection unit starts to increase after decreasing to a second standard within a predetermined time period after the predetermined processing being carried out on the selected display portion, the control unit performs control so that the predetermined processing is carried out when the data based on the pressure satisfies a standard lower than the first standard and higher than the selection standard.

6. The electronic device of claim 5, further comprising:
   a tactile sensation providing unit configured to vibrate a contact surface of the contact detection unit, wherein
   when the data based on the pressure detected by the pressure detection unit satisfies a tactile sensation providing standard that is set higher than the first standard, the control unit controls the tactile sensation providing unit to provide a tactile sensation to the contacting object that is in contact with the contact surface, and
   when the data based on the pressure starts to increase after decreasing to the second standard without the data based on the pressure satisfying the tactile sensation providing standard within the predetermined time period after the predetermined processing being carried out, the control unit performs control so that the predetermined processing is carried out when the data based on the pressure satisfies the lower standard than the first standard.

7. The electronic device of claim 5, wherein
   when a position of a contact detected by the contact detection unit when the predetermined processing is carried out differs from a position of a contact detected by the contact detection unit when the data based on the pressure starts to increase after decreasing to the second standard, the control unit performs control so that the predetermined processing is carried out when the data based on the pressure satisfies the lower standard than the first standard within a time period obtained by adding a predetermined additional time period to the predetermined time period.

* * * * *